United States Patent
Domeier et al.

(10) Patent No.: US 9,731,907 B2
(45) Date of Patent: Aug. 15, 2017

(54) APPARATUS AND METHOD FOR TRANSPORTING PLASTIC PREFORMS WITH DUAL PITCH DELAY

(71) Applicant: KRONES AG, Neutraubling (DE)

(72) Inventors: Bernhard Domeier, Pentling (DE); Harald Wels, Neutraubling (DE); Josef Penninger, Tettenweis (DE); Wolfgang Hausladen, Moetzing (DE)

(73) Assignee: Krones, AG, Neutraubling (DE)

(*) Notice: Subject to any disclaimer, the term of this patent is extended or adjusted under 35 U.S.C. 154(b) by 0 days.

(21) Appl. No.: 14/886,128

(22) Filed: Oct. 19, 2015

(65) Prior Publication Data

US 2016/0114984 A1    Apr. 28, 2016

(30) Foreign Application Priority Data

Oct. 21, 2014   (DE) .................. 10 2014 115 302

(51) Int. Cl.
*B65G 47/00*   (2006.01)
*B65G 47/08*   (2006.01)
(Continued)

(52) U.S. Cl.
CPC ........ *B65G 47/082* (2013.01); *B29C 49/4215* (2013.01); *B29C 49/06* (2013.01); *B65G 47/30* (2013.01); *B65G 69/20* (2013.01)

(58) Field of Classification Search
CPC .... B65G 47/08; B65G 47/082; B65G 47/841; B65G 47/842; B65G 47/846; B65G 47/847; B65G 47/848
(Continued)

(56) References Cited

U.S. PATENT DOCUMENTS 4,391,578 A    7/1983   Schaar
5,863,571 A *  1/1999   Santais ................ B29C 49/421
                                                         264/538
(Continued)

FOREIGN PATENT DOCUMENTS

DE           29716268         10/1998
DE         202013008055       10/2013
(Continued)

OTHER PUBLICATIONS

Extended European Search Report dated Mar. 17, 2016 issued in corresponding European patent application No. 15190902.5.
(Continued)

*Primary Examiner* — William R Harp
(74) *Attorney, Agent, or Firm* — Onello & Mello, LLP.

(57) ABSTRACT

Apparatus for treating plastic preforms, with a first transport facility transporting the plastic preforms along a predefined transport path at a first predefined pitch, with at least one heating unit heating the plastic preforms at least at times during their transportation and with a second transport facility arranged downstream with respect to the first transport facility in transport direction of the plastic preforms, which comprises a plurality of holding unit means for holding the plastic preforms and which is suitable and destined to alter a pitch between consecutive plastic preforms. The apparatus comprises a further transport section arranged, at least in sections, in transport direction of the plastic preforms between the first transport facility and the second transport facility, in which a pitch between the plastic preforms is altered.

8 Claims, 2 Drawing Sheets

(51) Int. Cl.
    *B29C 49/42*     (2006.01)
    *B29C 49/06*     (2006.01)
    *B65G 47/30*     (2006.01)
    *B65G 69/20*     (2006.01)

(58) Field of Classification Search
    USPC ............ 198/339.1, 459.2, 459.8, 461.1, 198/469.1–487.1, 803.1–803.15, 198/867.01–867.15
    See application file for complete search history.

(56) References Cited

U.S. PATENT DOCUMENTS

| | | | |
|---|---|---|---|
| 7,727,454 B2 * | 6/2010 | Freire-Diaz | B65G 23/30 198/468.3 |
| 8,684,724 B2 | 4/2014 | Borgatti et al. | |
| 9,199,406 B2 | 12/2015 | Winzinger et al. | |
| 2008/0230348 A1 * | 9/2008 | Damen | B65G 47/846 198/459.2 |
| 2011/0121497 A1 * | 5/2011 | Borgatti | B29C 49/36 264/523 |
| 2011/0151047 A1 | 6/2011 | Borgatti et al. | |
| 2013/0026005 A1 | 1/2013 | Senn | |
| 2015/0072036 A1 | 3/2015 | Winzinger et al. | |

FOREIGN PATENT DOCUMENTS

| | | |
|---|---|---|
| DE | 102012104956 | 12/2013 |
| DE | 102012105005 | 12/2013 |
| WO | 2010013200 A2 | 2/2010 |
| WO | 2010013200 A3 | 12/2010 |
| WO | 2011131704 | 10/2011 |

OTHER PUBLICATIONS

German Search Report dated Jun. 1, 2015, Issued in corresponding German Patent Application No. 10 2014 115 302.2.

\* cited by examiner

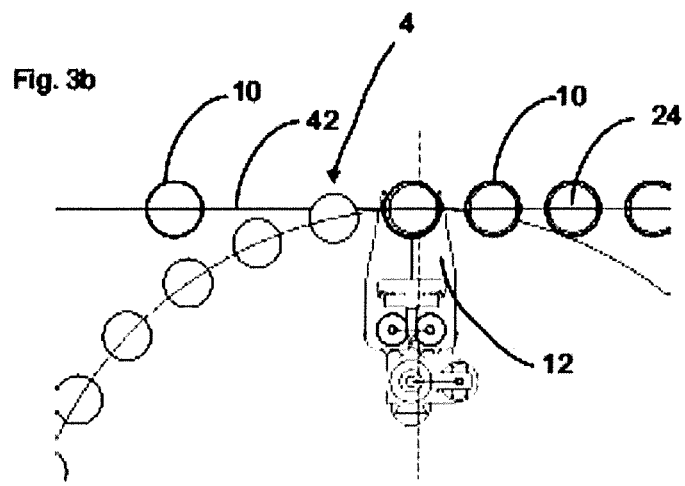
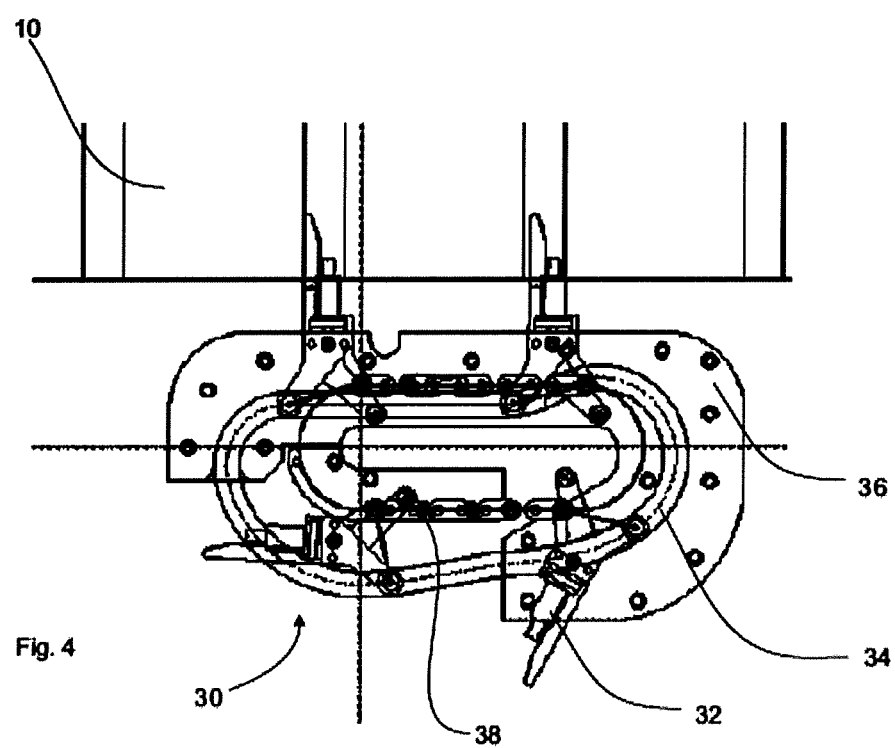

APPARATUS AND METHOD FOR TRANSPORTING PLASTIC PREFORMS WITH DUAL PITCH DELAY

RELATED APPLICATIONS

This application claims priority to German Patent Application Serial No. DE 10 2014 115 302.2, filed Oct. 21, 2014, the content of which is incorporated herein by reference, in its entirety.

FIELD

The present invention relates to an apparatus and a method for treating plastic preforms. It is known from the prior art that plastic containers are manufactured by initially heating the plastic preforms in an oven and then transforming them in their heated state into plastic containers by a transforming facility such as a stretch blow machine. Inside this oven the plastic preforms are normally conveyed with very small gaps between them or at a very small pitch. This pitch may be e.g. 38 mm. Subsequent transforming facilities by contrast, require much larger pitches of for example 445 mm, because individual transforming stations are relatively large in size.

DESCRIPTION OF DRAWINGS

FIG. 3b shows a detail view of the apparatus shown in FIG. 3a; and

FIG. 4 shows a possible embodiment of an acceleration mechanism.

DETAILED DESCRIPTION

Figure 1:
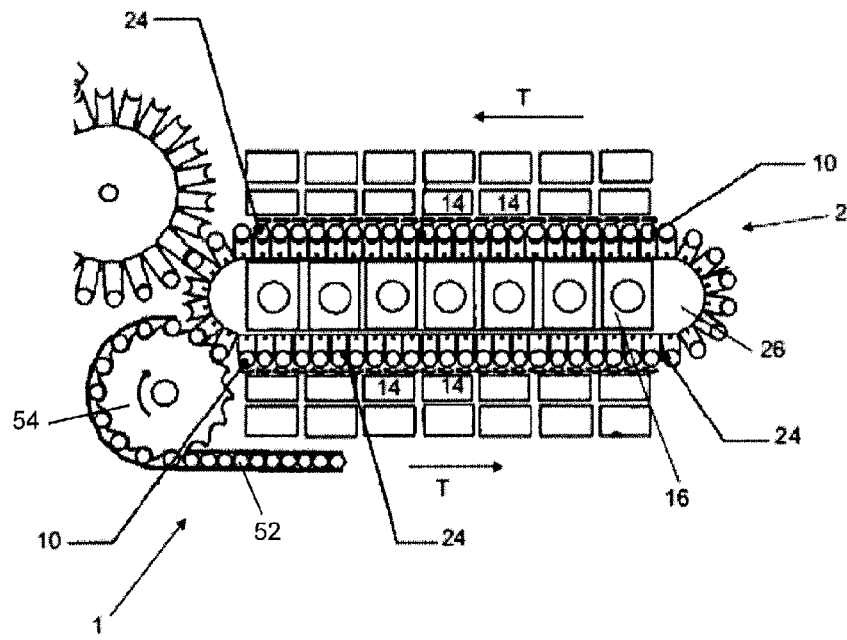
FIG. 1 shows an apparatus for heating the plastic preforms according to the state of the art.

In the prior art it is therefore known to use so-called pitch-delay turrets between the oven and the transforming station, which increase a pitch between successive plastic preforms. This technology works well for lesser transport and working speeds, but has its limits when it comes to higher transport speeds. The reason for this is that with machines of this kind the pitch-delay turrets need to apply very high accelerations upon the plastic preforms. This in turn leads to the plastic preforms being deformed. The state of the art has also disclosed transforming facilities which permit transformation of the plastic preforms in a clean room. With this embodiment also the said pitch-delay turrets are required to operate lubricant-free. In this case, in particular for high accelerations, these pitch-delay turrets are the weak part in a plant.

The present invention is therefore based on the requirement to achieve high pitch delays between the plastic preforms even for high operating speeds. Furthermore wear of such plants shall be reduced.

According to the invention these requirements are met by subjects of the independent claims. Advantageous embodiments and further developments are the subject of the sub-claims.

An apparatus according to the invention for treating plastic preforms comprises a first transport facility for transporting the plastic preforms along a predefined transport path with a first predefined pitch. Furthermore the apparatus comprises a heating means for heating the plastic preforms at least at times during their transport, as well as a second transport facility in the transport direction of the plastic preforms, which is arranged downstream relative to the first transport facility, the second transport facility comprising a plurality of holding means for holding the plastic preforms and being suitable and designed to alter the pitch between two successive plastic preforms, in particular to increase the pitch.

According to the invention, the apparatus comprises a (further) transport section, which is arranged at least in part in the transport direction of the plastic preforms, between the first transport device and the second transport device, in which a pitch is being altered.

Therefore, according to the invention, it is proposed that pitching is effected in two parts, in order, in this way, to counteract excessive pitching speeds or accelerations which act upon the plastic preforms. In particular, this permits the load acting upon the preforms from the above-mentioned pitch-delay turret or the load from the second transport facility to be reduced. As such it would be possible, for example, for a further transport facility for the transport of the plastic preforms to be provided, which would be arranged, at least in sections, in the transport direction of the plastic preforms between the first transport facility and the second transport facility, and which is also suitable and designed to alter, and in particular increase, a pitch between the plastic preforms.

In a further advantageous embodiment the apparatus therefore comprises a further transport facility, which is arranged in the transport direction of the plastic preforms between the first transport facility and the second transport facility.

Furthermore it is possible for the plastic preforms to be transported by means of this further transport facility with a pitch which deviates from the first pitch and which, in particular, is larger than the first pitch. The term "pitch" is understood to mean a distance between two plastic preforms which are next to it each other during transport in the transport facility.

In a further advantageous embodiment the second transport facility comprises a rotatable carrier on which a plurality of holding elements is arranged. The holding elements in turn may be arranged on holding arms. Advantageously these holding arms are pivotably arranged on said rotatable carrier. This pivoting can be used to alter the pitch between the plastic preforms.

In a further advantageous embodiment the second transport facility is a so-called pitch delay turret, which in particular is suitable for increasing a pitch between adjacent plastic preforms.

In a further advantageous embodiment the apparatus comprises a transforming facility after the second transport facility for transforming the plastic preforms into plastic containers. This transforming facility in particular, is a blow-moulding machine, especially particularly a so-called stretch-blow machine. This transforming facility may be arranged directly after to the second transport facility, but it is also feasible that a further aggregate such as a sterilisation means is arranged between the second transport facility and the transforming facility. This transforming facility may also comprise a rotatable carrier on which a plurality of transforming stations is arranged, in which the plastic preforms are reshaped.

In addition a sterilisation means could be arranged at this point for sterilising the plastic preforms.

The heating means is in particular an infrared oven, but a microwave oven could also be used.

In a further advantageous embodiment the heating means comprises a plurality of heating elements, which are preferably stationary with regard to the transport path of the plastic preforms. These heating elements in particular may for example be infrared tubes, which especially preferably extend, at least in sections, along the transport path of the plastic preforms. Apart from these heating elements reflector elements may be provided which guide the infrared rays onto the plastic preforms.

Here it is proposed to provide two acceleration paths which alter and in particular enlarge a pitch between the plastic preforms. It would be possible that the further transport facility also comprises a constant pitch and that an acceleration stretch/path is provided between the first transport facility and the further transport facility.

In a further advantageous embodiment the first transport facility comprises a circulating transport means, on which a plurality of holding elements for holding the plastic preforms is arranged. In this way the first transport facility preferably transports the plastic preforms separately. Advantageously the holding elements comprise thorns, which engage in mouths of the plastic preforms in order to retain them. Furthermore a rotating device may be provided, which during heating of the plastic preforms permits rotation of the same about their longitudinal direction. In this way uniform heating of the plastic preforms can be achieved.

In a further advantageous embodiment the apparatus comprises a further transport facility for the transport of plastic preforms, which is arranged, at least in sections, in the transport direction of the plastic preforms between the first transport facility and the second transport facility, which further transport facility is also suitable and designed to alter a pitch between the plastic preforms and/or which transports the plastic preforms with a further pitch, which deviates from the first pitch and in particular is larger than this.

In a further advantageous embodiment the further transport facility also comprises a circulating transport means, on which a plurality of holding elements for holding the plastic preforms is arranged. This transport means may be a transport chain or the transport belt, on which the individual holding elements are arranged. Advantageously the circulating transport means is designed with stretches having/such as comprising different curvatures. For example two semi-circular ends may be provided, which have linearly extending transport stretches between them.

In a further advantageous embodiment at least one transport facility and preferably the further transport facility comprise a carrier and at least one holding element, which is movably arranged with respect to this carrier. In this embodiment the carrier is preferably stationary and the holding element for holding the plastic preforms is configured so as to be movable relative to this carrier. Preferably this carrier also serves as a guide for the holding element. Preferably the further transport facility comprises a plurality of holding elements which are movably arranged with respect to this carrier. Preferably these holding elements are movable independently of each other with respect to this carrier. Due to this independent movement the above-mentioned pitch between the holding elements can be altered.

Preferably the carrier comprises at least one magnetic element which in particular serves to move the holding elements with respect to the carrier. In a further advantageous embodiment the carrier forms a circulating transport path for the holding elements. Furthermore the holding element may also preferably comprise a motor means and in particular a servomotor in order to move the holding element relative to the carrier. Furthermore the holding element itself may be arranged on a carrying element and this carrying element in turn may be movably arranged on the carrier.

In a further advantageous embodiment at least one holding element or one carrying element on which this holding element is arranged, is designed to move in a magnetic-force-dependent manner, wherein this is preferably effected in interaction with the carrier of the transport facility. Preferably the holding element is slidably supported on the carrier. An air gap may be formed between the holding element and the carrier.

Preferably at least one permanent magnet is arranged on the holding element and/or a carrying element holding the holding element. Preferably at least two permanent magnets are arranged on this holding element. The carrier has preferably at least one magnetic coil, preferably a plurality of magnetic coils arranged on it. It is possible for the magnetic coils to be individually powered, which causes a migrating field to be generated, which in turn causes the holding elements to be fed forwards.

In a further advantageous embodiment at least one transport facility and in particular the further transport facility comprises a position detecting device, which detects a position of the holding elements relative to the carrier. In addition a detecting device may be provided which detects a speed of the holding elements relative to the carrier. This position detecting device may comprise at least one light barrier element.

In a further advantageous embodiment a plane enclosed by the circulating transport means of the first transport facility and a plane enclosed by the circulating transport means of the further transport facility overlap one another. Advantageously these planes are horizontally extending planes, which in particular means that the areas reachable by the individual transport means also overlap. Advantageously therefore a plane exists through which both transport means extend. Advantageously this plane extends perpendicularly to the transport path or the transport direction of the plastic preforms. This will be explained in more detail with reference to the figures.

In a further advantageous embodiment the further transport facility is suitable for accepting plastic preforms from the first transport facility and this is also its purpose. Advantageously however, the further transport facility is also suitable for transferring plastic preforms to the first transport facility and this is also its purpose.

With this arrangement it is possible that this further transport facility transports the plastic preforms with a slower speed than the first transport facility. As such it is, for example, possible that the feeding device such as a single-clock turret transfers the plastic preforms to the further transport facility and that this, in turn, transfers the plastic preforms to the first transport facility. After the plastic preforms have been transported with the first transport facility, they can again be transferred to the further transport facility, albeit in another area, and then preferably from this further transport facility to the above-mentioned second transport facility. Preferably the apparatus thus comprises at least three transport facilities, which transport the plastic preforms with pitches which vary relative to each other. Preferably the pitch during transportation with the first transport facility is the smallest and the pitch during transportation with the second transport facility is the largest.

In a further advantageous embodiment the apparatus comprises at least one holding element for holding the plastic preforms, which at times is arranged on a transport means of the first transport facility and at times on a transport means of the further transport facility. This makes it possible for the holding element to be transferred together with a plastic preform held in it by the first transport facility to the further transport facility. Thus it is possible to avoid removal of the plastic preforms at this point in time.

Instead the holding element together with the plastic preform is transported onwards. Instead of a transport chain it is also possible to use a transport rope. As such it would be possible, for example, for the plastic preform to be carried on the first transport facility as far as a redirection wheel and in the area of this change of direction to be transferred to or e.g. rehung onto the transport means of the further transport facility. By means of this further transport means the one or more plastic preforms can then be transported at a higher speed and also at a higher pitch and can preferably be carried onwards to the second transport facility. In this way it is possible for the holding elements on the second transport means such as a second transport chain or a second rope to comprise for example a threefold pitch. After the transfer of the plastic preforms it would be possible for the holding elements to couple-in again at their original position, for example on the first transport means (i.e. the transport means of the first transport facility). However it would also be possible, at the same time, for the holding elements to receive a further plastic preform in this position.

In this embodiment the holding element as a whole is decoupled together with the plastic preform from the transport means of the first transport facility and coupled into the transport means of the further transport facility. However, it would also be possible for the holding elements to remain on their respective transport means and for the plastic preforms to be transferred from the holding elements of the first transport facility to the holding elements of the further transport facility. As such it would be possible if at the end of a heating cycle a clamp of an intermediate unit grips the plastic preform. Subsequently this plastic preform can be accelerated and transferred to a new pitch. Subsequently the plastic preform can be coupled into the transport means of the further transport facility. With this arrangement it would be possible if the transport means circulating at a higher speed holds the plastic preform by means of a thorn or engages in the mouth of the plastic preform. An inflow turret could grip the plastic preform, as known, above its carrying ring.

However, it would also be possible if the whole or a part of the holding element were decoupled from the transport means and coupled into the second transport means. With this arrangement it would be possible if the plastic preform together with the holding thorn is pulled away in a downward direction and then coupled in again. With this realisation it would be possible to omit the gripping of the warm or soft plastic preform and to grip only the thorn holding this plastic preform.

Another solution would be to effect the decoupling and coupling by means of magnetic elements. As such, a magnet could be provided on each holding element so that the unit is released from the transport means by means of induction, followed by being accelerated and finally coupled into the second transport means. This could be done using electromagnets which make such decoupling and coupling possible.

In a further embodiment it would be possible for the plastic preforms, after they have left the first transport means, to be accelerated by means of an acceleration unit such as a feeding screw, to a higher transport speed and in this state, to engage in the second transport means. With a further realisation it would also be feasible to omit the said intermediate unit and to couple the plastic preforms or their holding elements directly from the transport means of the first transport facility into the transport means of the second transport facility.

In a further advantageous embodiment the apparatus comprises a magnetic mechanism for fixing the holding elements on at least one transport means.

Advantageously the apparatus, as mentioned above, comprises an acceleration unit which accelerates the plastic preforms prior to their transfer from the first transport facility to the further transport facility.

The present invention is further aimed at a method for treating plastic preforms, wherein plastic preforms are transferred to a first transport facility and transported by this first transport facility and during their transportation are heated by means of at least one heating means and wherein the plastic preforms after transportation by the first transport facility are transported with a second transport facility and this second transport facility alters and in particular increases a distance between two consecutive plastic preforms.

According to the invention the plastic preforms, between transportation with the first transport facility and transportation with a second transport facility, are transported with a further transport facility, wherein the plastic preforms, at least at times during transportation with the further transport facility, are transported at a larger pitch than during transport with the first transport facility.

Therefore, with respect to the method, it is proposed that a two-fold acceleration of the plastic preforms or a two-fold alteration and in particular an increase in pitch is performed.

In a further advantageous embodiment the further transport facility comprises a circulating transport means which in particular transports the plastic preforms at a constant pitch. Preferably therefore the pitch is constant during transportation with the first transport facility and preferably the pitch during transportation with the further transport facility is also constant. Advantageously an acceleration stretch is provided between the first and the second transport facility, and this is where the pitch between the individual plastic preforms is increased. However, this does not involve a further feeding screw as further transport facility.

Advantageously however, the second transport facility, during transportation, also alters the pitch between individual plastic preforms.

In a further advantageous embodiment the plastic preforms are transferred to the further transport facility.

In a further advantageous embodiment at least at times, a speed of movement and/or a pitch between two consecutive holding elements for plastic preforms is delayed/decreased. In particular this may be effected during transfer of the holding elements from the further transport facility back to the first transport facility.

Preferably a pitch with the first transport facility or during transportation with the first transport facility is constant. Preferably also the pitch with the further transport facility/ during transportation with the further transport facility is constant. Preferably an acceleration stretch is provided between the first transport facility and the further transport facility.

Preferably the apparatus does not comprise a feeding screw. Especially preferably the second transport facility alters a pitch during transportation of the plastic preforms. Preferably another deceleration stretch is provided during transfer of the holding elements from the further transport facility to the first transport facility.

FIG. 1 shows a schematic view of an apparatus for heating plastic preforms. The plastic preforms 10 are fed individually into the apparatus 1 via a feeding rail 52 and a single-clock turret 54. In the view shown in FIG. 1 the units for producing the pitch delay are not depicted, it would however be possible for the single-clock turret to not directly transfer the plastic preforms, as shown in FIG. 1, to the first transport facility 2, but to the further transport facility 4, which is shown in the subsequent figures.

The plastic preforms are conveyed through the apparatus 1 by means of the transport facility 2 and during this process are conveyed past a plurality of heating means 14 and heated by these. At the same time the plastic preforms are rotated about their longitudinal direction. The reference symbol 16 denotes a cooling means which cools the plastic preforms 10 or their outer surfaces with cooling air. Reference symbol 26 denotes a change-of-direction area of the transport facility 2, in which the transport direction of the plastic preforms is reversed. Reference symbols 24 denote holding means for holding the plastic preforms 10.

Figure 2:
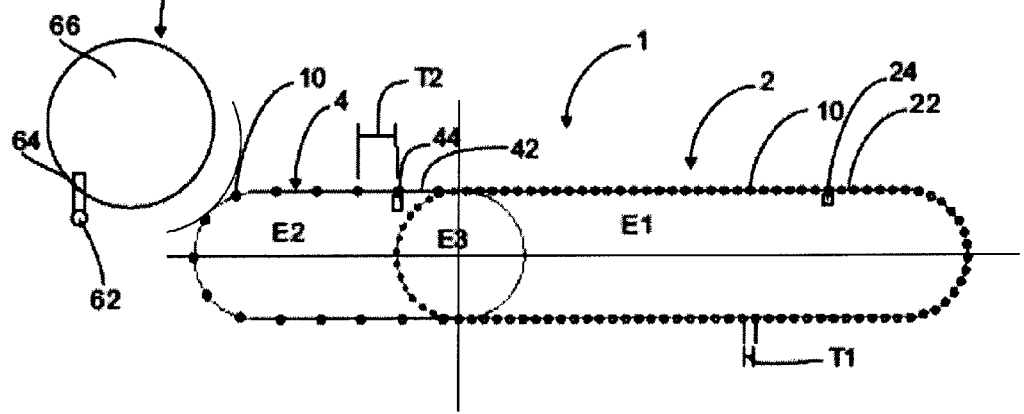
FIG. 2 shows a schematic view of an apparatus according to the invention.

FIG. 2 shows a schematic view of an apparatus 1 according to the invention for treating plastic preforms. Again the first transport facility 2 is shown, which here carries the plastic preforms 10 past heating means (not shown). This first transport facility 2 comprises a circulating transport means 22 such as a transport chain. On this transport chain 22 a plurality of holding elements 24 (only one is shown) are arranged, which again serve to hold the plastic preforms 10.

Reference symbol E1 refers to a plane which is enclosed by the transport means 22.

Reference symbol 4 denotes the further transport facility which also serves to transport the plastic preforms 10. To this end a plurality of holding elements 44 serving to hold the plastic preforms is arranged on a transport means 42 such as a transport chain which is also circulating. Reference symbol E2 refers to a plane which is enclosed by the circulating transport means 44. One can recognise that planes E1 and E2 overlap, in particular in the intersection area E3.

Initially the plastic preforms are carried on the first transport facility 2 and are subsequently transferred to the further transport facility 4. One can recognise that here a pitch T2 between individual plastic preforms is larger than a pitch T1 in the area of the first transport facility. Thus a pitch between the plastic preforms is enlarged, at least during transfer of the plastic preforms from the first transport facility 2 to the further transport facility 4. Also the further transport facility 4 transports the plastic preforms 10 at a higher circulating speed than the first transport facility 2.

The further transport facility 4 adjoins the second transport facility 6, which in this case is a pitch delay turret. This second transport facility 6 comprises a plurality of holding means 62 (only one is shown) which is preferably pivotably arranged on a carrier of the second transport facility 6. Reference symbol 64 denotes an arm which has the holding means 62 arranged on it. Reference symbol 66 denotes a rotatable carrier, which has individual arms 64 and thus also holding means 62 arranged on it. This second transport facility 6 also serves to alter, in particular increase, a pitch between the plastic preforms. This means that the pitch T2 is further enlarged.

Figure 3A:
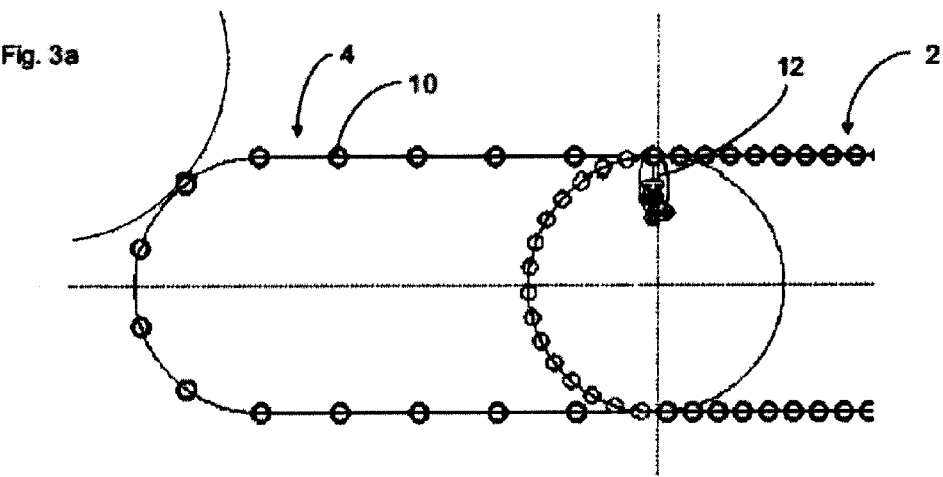
FIG. 3a show a detail view of the apparatus of FIG. 2.

FIG. 3a shows a detail of the apparatus 1 shown in FIG. 2. An acceleration unit 12 can be recognised, which here serves to transfer the plastic preforms from the first transport facility 2 to the further transport facility 4.

FIG. 3b is an enlarged view of this acceleration unit 12. This acceleration unit 12 may be a gripping element which, as shown in FIG. 3b, takes the plastic preforms off the holding elements 24 and transfers them to further (not shown) holding elements of the further transport facility 4. But here again it is possible that this acceleration unit 12 transfers the holding elements 24 together with the plastic preforms 10 arranged on them to the transport means 42 of the further transport facility 4.

The principle explained here by means of the figures is similar to a cable car system, but here an acceleration occurs during transfer from the first transport facility to the further transport facility with travel speed increasing during transfer. During change of direction the holding element or a thorn can be rehung onto the second transport means or a second rope, on which it subsequently travels at a higher speed such as a threefold speed. In this way the pitch between the plastic preforms or their holding elements on the transport means of the further transport facility 4 is higher, for example three times as high, whilst it is still possible for the holding element or the thorn to be coupled in at its original position. The entire holding element with the plastic preform arranged on it, can thus be decoupled and again coupled into the transport means 42.

If, as illustrated in FIG. 3b, the plastic preform is pulled off, it would be possible for the plastic preform to be gripped at the end of the heating cycle by a clamp of an intermediate unit, then to be accelerated and to be changed to a new pitch. Furthermore the plastic preform can then be coupled into the new transport means. The further (circulating) transport means 42 could also hold the plastic preform with a thorn or engage in its mouth.

In this context it would be possible for the first transport facility to comprise holding thorns which engage in the mouths of the containers and for the further transport facility to comprise gripping clamps, which for example grip the plastic preform below its carrying ring. A reverse realisation would also be feasible, that is that the first transport facility comprises gripping elements which grip the plastic preforms at their mouths, for example below their carrying rings and the further transport facility comprises holding thorns which enter into the mouths of the plastic preforms. Another possibility would be that both the first transport facility and the further transport facility each comprise holding thorns, which engage in the mouths of the container, or comprise gripping elements, which grip the plastic preforms at their mouths.

FIG. 4 shows a further embodiment of an apparatus according to the invention. Specifically, an acceleration unit is shown here which for example may be arranged between the first transport facility 2 and the further transport facility 4 and which serves to accelerate the plastic preforms 10 and/or the holding means with the plastic preforms arranged thereon.

In this embodiment circulating pushing elements 32 may be provided which are all guided in a guiding rail or a guiding belt 34. The guiding rail or individual bends thereof can be designed such that plastic preforms (shown only schematically) or holding elements for the plastic preforms are separated from each other and "spaced out". Reference symbol 36 denotes a carrier on which the pushing elements 32 are arranged in a circumferential way. The rail or the belt 34 and a further preferably inner (and in particular also circulating) rail or belt 38 may be realised in such a way that the pushing elements 32 engage in gaps between two adjacent plastic preforms or their holding elements, thus, while moving, increasing the distance between two consecutive holding elements or plastic preforms. This "spacing out" is achieved, in particular, in that the speed of the second rail or the second belt 38 is higher than that of the first rail or the first belt 34.

A further realisation could involve e.g. a magnetic coupling system. For example, a magnet could be arranged at each holding element so that with the aid of induction the unit could be detached from the transport means such as a chain, then be accelerated to reach the second speed and then coupled into the second chain or the second transport means.

The applicant reserves the right to claim all features disclosed in the application documents as being essential to the invention insofar as they are new relative to the state of the art, individually or in combination.

What is claimed is:

1. An apparatus for treating plastic preforms, with a first transport facility transporting the plastic preforms along a predefined transport path at a first predefined pitch, with at least one heating means heating the plastic preforms at least at times during their transportation and with a second transport facility arranged downstream with respect to the first transport facility in transport direction of the plastic preforms, the second transport facility comprising a plurality of holding means for holding the plastic preforms and which is constructed and arranged to alter a pitch between consecutive plastic preforms, wherein the apparatus comprises, a further transport facility arranged in the transport direction of the plastic preforms between the first transport facility and the second transport facility, in which a pitch between the plastic preforms is altered;

wherein the first transport facility comprises a circulating transport means, on which a plurality of different holding means for holding the plastic preforms is arranged, and wherein:

the pitch is altered in two parts to counteract excessive pitching speeds or accelerations which act upon the plastic preforms, the two parts including the further transport facility that alters the pitch and the second transport facility that further alters the pitch.

2. The apparatus according to claim 1, wherein the further transport facility comprises a circulating transport means, on which a plurality of holding means for holding the plastic preforms is arranged.

3. The apparatus according to claim 2, wherein a plane enclosed by the circulating transport means of the first transport facility and a plane enclosed by the circulating transport means of the further transport facility overlap one another.

4. The apparatus according to claim 1, wherein the further transport facility comprises a carrier and at least one holding means which is movably arranged with respect to this carrier.

5. The apparatus according to claim 1, wherein the further transport facility operates to accept plastic preforms from the first transport facility or to transfer the plastic preforms to the first transport facility.

6. The apparatus according to claim 1, wherein the apparatus comprises at least one holding means for holding the plastic preforms, which at times is arranged on a transport means of the first transport facility and at least at times on a transport means of the further transport facility.

7. The apparatus according to claim 1, wherein the apparatus comprises an acceleration unit, which accelerates the plastic preforms during transfer from the first transport facility to the further transport facility.

8. The apparatus according to claim 1, wherein the pitch is further altered by the first transport facility.

* * * * *